(12) United States Patent
Hiles et al.

(10) Patent No.: US 9,143,026 B2
(45) Date of Patent: Sep. 22, 2015

(54) METHOD AND APPARATUS FOR REGULATING HIGH VOLTAGE

(71) Applicant: Schlumberger Technology Corporation, Sugar Land, TX (US)

(72) Inventors: Kevin L. Hiles, Pittstown, NJ (US); Robert A. Adolph, Pennington, NJ (US); Jacques Jundt, Newton Highlands, MA (US); Vincent Ernst, Pennington, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 14 days.

(21) Appl. No.: 14/199,175

(22) Filed: Mar. 6, 2014

(65) Prior Publication Data
US 2015/0194871 A1    Jul. 9, 2015

Related U.S. Application Data

(60) Provisional application No. 61/775,422, filed on Mar. 8, 2013.

(51) Int. Cl.
*E21B 49/00* (2006.01)
*H02M 1/00* (2007.01)
*G01V 5/10* (2006.01)
*G01V 5/12* (2006.01)

(52) U.S. Cl.
CPC ............... *H02M 1/00* (2013.01); *E21B 49/00* (2013.01); *G01V 5/10* (2013.01); *G01V 5/12* (2013.01); *H02M 2001/0003* (2013.01); *H02M 2001/0012* (2013.01)

(58) Field of Classification Search
CPC .......... H02M 1/00; H02M 2001/0003; H02M 2001/0012; E21B 49/00; G01V 5/10; G01V 5/12
See application file for complete search history.

(56) References Cited

U.S. PATENT DOCUMENTS

| | | | |
|---|---|---|---|
| 3,546,512 A | 12/1970 | Frentop | |
| 3,756,682 A | 9/1973 | Frentop | |
| 3,775,216 A | 11/1973 | Frentop | |
| 2008/0042242 A1 | 2/2008 | Hall et al. | |
| 2009/0237854 A1 | 9/2009 | Mok et al. | |

FOREIGN PATENT DOCUMENTS

| | | |
|---|---|---|
| JP | 2003078364 A | 3/2003 |
| JP | 2003207527 A | 7/2003 |
| KR | 100767475 B1 | 10/2007 |

OTHER PUBLICATIONS

International Search Report and Written Opinion issued in PCT/US2014/022069 on Jul. 28, 2014, 11 pages.

*Primary Examiner* — Mark R Gaworecki
(74) *Attorney, Agent, or Firm* — Michael Dae

(57) ABSTRACT

A method for regulating output of a high voltage generator includes monitoring a voltage output of the generator and comparing it to a voltage setpoint to generate an error signal. A load on the generator is monitored to generate a load signal. The load signal is conducted to a feedforward signal generator. The feedforward signal generator is configured to produce a feedforward signal corresponding to the load and to at least one parameter related to an output impedance of the high voltage generator. The error signal is conducted to a high voltage regulation loop. The control loop output and the feedforward signal generator output are coupled to a driver for the high voltage generator.

21 Claims, 5 Drawing Sheets

METHOD AND APPARATUS FOR REGULATING HIGH VOLTAGE

CROSS-REFERENCE TO RELATED APPLICATIONS

This application claims benefit of U.S. provisional patent application Ser. No. 61/775,422, filed Mar. 8, 2013, which is herein incorporated by reference.

STATEMENT REGARDING FEDERALLY SPONSORED RESEARCH OR DEVELOPMENT

Not applicable.

BACKGROUND

This disclosure relates generally to the field of high voltage power supplies that may be used in devices such as radiation generators. More specifically, the disclosure relates to voltage regulation methods and devices for maintaining high voltage within predetermined tolerances notwithstanding changes in load on the high voltage power supply and environmental conditions to which the instrument having the high voltage power supply is exposed.

Electronic radiation generators, for example, (including pulsed neutron generators and x-ray generators) require high voltages for the production of the desired nuclear radiation. These voltages, which can exceed 100 kV DC, and may be as much as 500 kV, are produced by power supplies typically of the Cockcroft-Walton voltage multiplier design. The simplest Cockcroft-Walton voltage multiplier design includes an array or ladder-like structure of stages where, under an AC drive signal (e.g., Us in the schematic below) the voltage at the output of the n-th stage is n times the peak-to-peak value of Us.). Each stage includes discrete components, specifically (2) capacitors and (2) diodes in the arrangement shown in the electrical schematic diagram in FIG. 1. Also included is a voltage divider (or "bleed") resistor chain (not shown) that may be used to measure the power supply output voltage.

It is known in the art to use a regulation loop to control the high voltage which may or may not include a proportional-integral-derivative (PID) regulation loop. Most types of control loops use an error term related to the difference between a high voltage monitor, which may be measured using a voltage divider with a bleed resistor, and a high voltage set point. Such control loop may be implemented in analog or digital form. The control loop adjusts the drive voltage, defined by Us in FIG. 1, to cause the power supply to generate the desired high voltage output. One limitation of known control loops arises when the load current (e.g., beam current in an x-ray or neutron generator) varies rapidly (i.e. faster than the response time of the control loop) temporally. The changes in load cause the high voltage output to vary, which may stress the high voltage system including the components that make up the ladder and the insulation system surrounding the high voltage power supply. As a hypothetical example, if 5 kV control signal (Us) were used to generate 100 kV power supply output, under heavy load and with an insulation system designed to withstand 110 kV, if the load abruptly dropped, the power supply high voltage output could quickly increase to 120 kV if the effective output impedance of the high voltage power supply is large. This could cause the insulation system or power supply components to be damaged, perhaps permanently.

Conversely, when there is a sudden increase in load current, the high voltage could drop, and in the case of an electrically operated radiation generator, the radiation output and possibly the measurement made by an instrument using such generator could be affected.

To mitigate the foregoing limitation, it is known in the art to use a hardware-embodied circuit to monitor the load current, which tends to lead the change in output voltage, and add a proportional voltage to the drive voltage (Us) or otherwise modify a drive signal such as drive frequency or drive duty factor. In the event that the load current is reduced, the proportional voltage or drive signal would be reduced, thus mitigating the risk of overshoot and subsequent damage to the high voltage system. Corresponding, opposite changes to the drive signal may be applied in the event the load current increases. An example hardware embodied circuit to control the drive signal can be observed in FIG. 2.

SUMMARY

A method according to one aspect for regulating output of a high voltage power supply includes monitoring a voltage output of the power supply and comparing it to a voltage setpoint to generate an error signal. A load on the power supply is monitored to generate a load signal. The load signal is conducted to a feedforward signal generator. The feedforward signal generator is configured to produce a feedforward signal corresponding to the load signal and to at least one parameter related to behavior of the high voltage power supply, such as output impedance or other internal characteristics. The error signal is conducted to voltage control loop. The voltage control loop and the output of the feedforward signal generator are coupled to a driver for the high voltage power supply.

DETAILED DESCRIPTION

Figure 1:
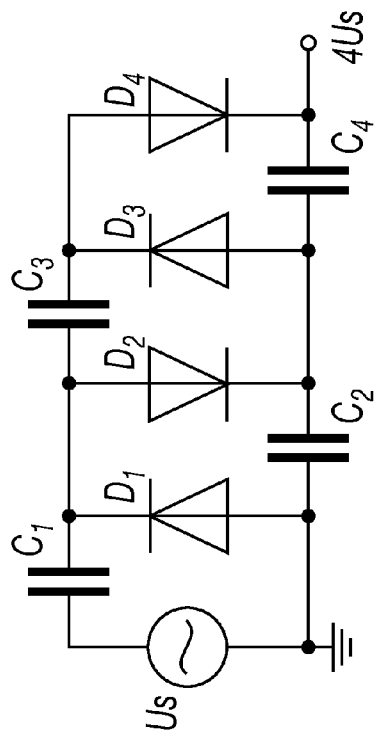
FIG. 1 shows an example Cockcroft-Walton ladder high voltage power supply.
Figure 2:
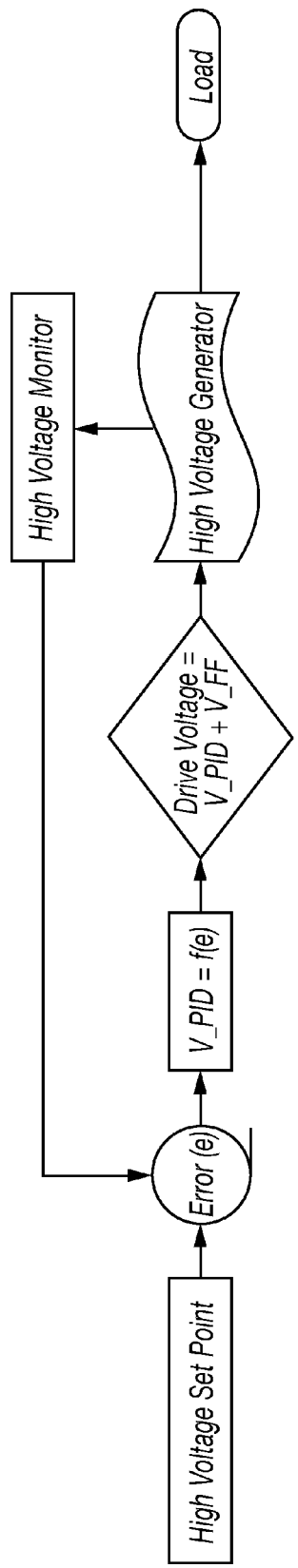
FIG. 2 shows an example voltage control system known in the art.
Figure 3:
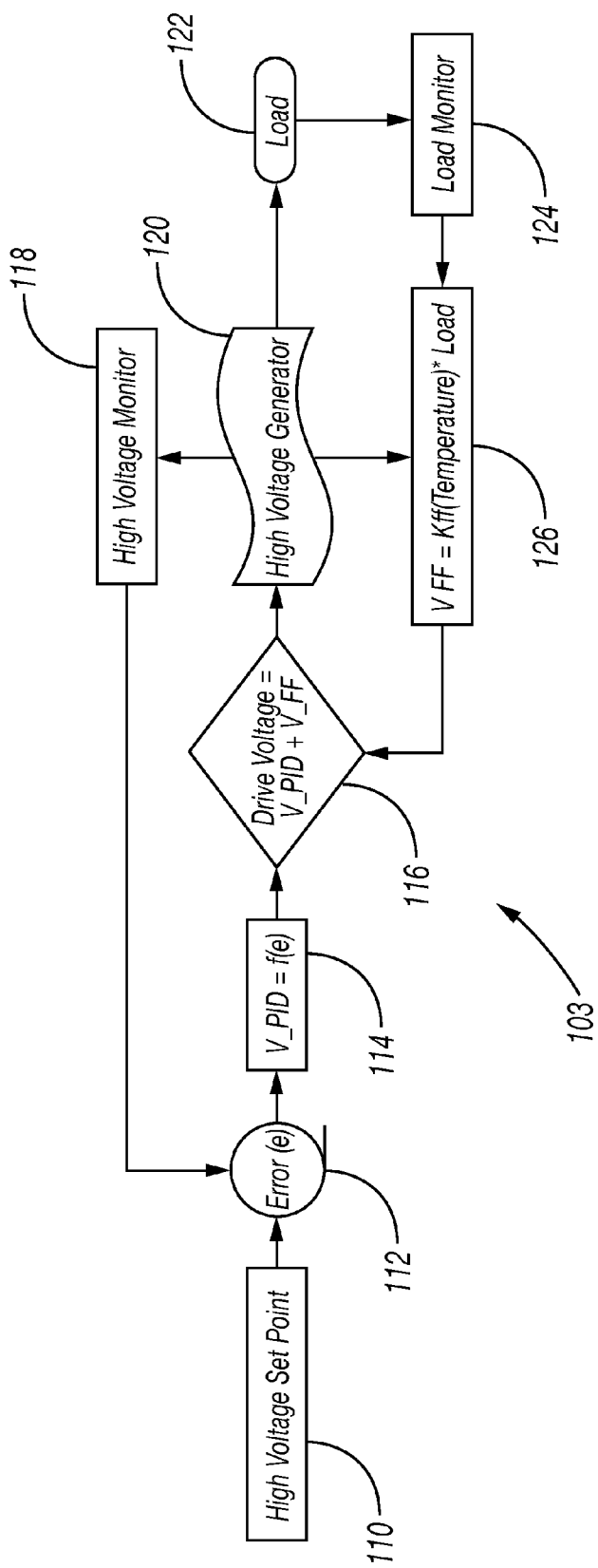
FIG. 3 shows an example voltage control system according to the present disclosure.

FIG. 3 shows a high voltage power supply 103 with an example voltage control system according to the present disclosure. The voltage control system may be implemented, e.g., in the form of firmware executed in a microprocessor. The scope of the present disclosure may also include implementations, for example and without limitation, in field programmable gate arrays (FPGAs), complex programmable logic devices (CPLDs) and application specific integrated circuits (ASICs). The high voltage power supply 103 may include a high voltage generator 120 (e.g., a Cockcroft Walton ladder as shown in FIG. 1 or other voltage multiplier). The high voltage generator 120 may be connected to a load 122. A non-limiting example of the load 122 is now explained with reference to FIG. 4. The load magnitude on the high voltage generator 120 may be monitored by a load monitor 124, which may be implemented as a high impedance voltage measuring circuit coupled across a resistor disposed between the load 122 and one terminal of the high voltage generator 120. An output of the voltage multiplier 120 and the load monitor 124 may be conducted to a feedforward signal generator 126. Output of the feedforward signal generator 126 may be connected to a driver signal input of a voltage control loop 116. Another input to the voltage control loop 116 may be an error signal generated by measuring the voltage from the high voltage generator at 118 (a high voltage monitor) and comparing it to a voltage setpoint, which may be a predetermined value at 110 to generate an error signal at 112. A control signal (e.g., implemented as an analog voltage or a digital signal corresponding to the error signal magnitude) may be generated at 114. V_FF, which is the output of the feedforward signal generator 126 stands for "Feed-Forward Voltage"; it is a voltage (or digital signal) which may be a function of the instantaneous load, and which may be added as a term to the voltage control loop 116 output voltage. Kff is a coefficient used to derive V_FF. Kff may be constant, but may also be a function of operating parameters and operating environment. In the example shown in FIG. 3, Kff is a function of temperature, however as explained below, Kff may also be related to other parameters.

Both the control voltage (from 114) and the feedforward signal (from feedforward signal generator 126) may be used in the control loop 116 to generate a suitable drive voltage (Us in FIG. 1) to operate the high voltage generator 120. This is shown as the output of the control loop 116 being conducted to a control input of the high voltage generator 120.

In the present example, the feedforward signal generator 126 may be responsive, in addition to changes in load on the high voltage generator 120, to other operating and environmental parameters that affect the output impedance of the high voltage generator 120. Such parameter response may result in changes in the value of Kff and thus the value of V_FF. Each of such parameters may be used in selected combinations to create an optimized feedforward signal generated by the feedforward signal generator 126. Output impedance is generally defined for purposes of the present disclosure as a ratio of change in output voltage of the high voltage generator 120 to change in load current thereon, but could be replaced with other internal characteristics that define the output of the high voltage generator 120 with respect to a particular driver signal (from 116).

The foregoing parameters may include, but are not limited to: temperature; operating frequency (rate of generation of high voltage pulses by the power supply 103); operating pulse width (duration of high voltage pulses when the power supply 103 is operated in a pulsed mode); age of the high voltage system (i.e., the power supply components and associated insulation and load components; and the pulsing mode (in the case of a pulsed application with multiple pulsing schemes, i.e., durations and numbers of high voltage pulses with respect to time). The foregoing parameters may also include compensation for the load sensing network response, for example, to compensate for time delay from filtering in this network. Anticipated change in load due to other operating parameters of the system (such as a pending external request for more or less radiation output) may also be implemented in the feedforward signal generator. The use of the aforementioned parameters is indicated by the direct connection in the diagram 103 between the High Voltage Generator 103 and the feedforward signal generator 126.

It should be noted that a possible advantage of the foregoing implementation lies in the fact that the high voltage regulation can, in many circumstances when a load changes, be anticipated and corrective action implemented before the effect of such load change, may be mitigated by a prior art voltage regulation loop to ensure minimal variations in high voltage applied to the load. An example high voltage power supply regulated as explained above may be used in a pulsed neutron generator (PNG) as explained with reference to FIG. 4. The neutron generator 10 may include a hollow cylindrical tube 11 made of an insulating material such as alumina ceramic and having its respective longitudinal extremities fixed to a ceramic ring 12 and a conductive ring 13, an ion source 45, a gas reservoir 25, an extracting electrode 50, and a copper target electrode 15. A transverse header 14 and the target electrode 15 close the ceramic rings 12 and 13, respectively, to provide a gas-tight, hermetic cylindrical envelope. Ceramic ring 12 comprises parallel transversely disposed flanges 6, 7, 8, and 9, to provide electrically conductive paths and structural support for the PNG components as described subsequently in more complete detail. Flanges 6-9 may be substantially equally spaced along ring 12, between header 14 and the corresponding extremity of the cylindrical tube 11. The gas reservoir 25 may be disposed transversely or axially with respect to the longitudinal axis of the neutron generator 10, between the first flange 6 and the second flange 7, closest to the header 14. The gas reservoir 25 comprises a helically wound filament 26 which may be made of tungsten or other electrically resistive metal, and which may be heated to a predetermined temperature by an electric current from a controllable power supply 105 to which both ends 26a and 26b of filament 26 are connected.

The filament is 26 disposed within a getter 44 made of a sintered, porous material. The filament 26 is heated electrically by passing therethrough electric current from the controllable power supply in order to heat the surrounding getter 44 to provide a supply of deuterium and or tritium gas in the interior of the cylindrical tube 11, and control gas pressure during neutron generator 10 operation.

The gases desorbed by the getter 44 spread through holes provided in flanges 7-9, e.g., a hole 31 in the second flange 7, a hole 33 in the third flange 8 and holes 34, 35 in the fourth flange 9. The gases desorbed enter an ion source 45 which may be interposed between the gas reservoir 25 and the extremity of the tube 11 facing ceramic ring 12. An annular shaped electrical insulator 90 may be interposed between the tube 11 and the ceramic ring 12.

The ion source 45 may comprises a cylindrical, hollow anode 57 aligned with the longitudinal axis of the generator 10 and may be in the form of either a mesh or a coil. Typically, a positive ionizing potential (either direct or pulsed current) in the range of 100-300 volts relative to a cathode 80, is applied to the anode 57. In one example, the anode 57 may be about 0.75 inch (1.9 cm) long and may have a diameter of approximately 0.45 inch (1.14 cm). The anode 57 is typically secured rigidly to the fourth flange 9, e.g. by conductive pads 60.

The ion source 45 may also include the cathode 80 being disposed close to the outside wall of the anode 57, in a substantially median position with respect to the anode 57. The cathode 80 may include an electron emitter 81 comprising a block of material susceptible, when heated, to emit electrons. The emitter 81 may be fixed (e.g., by brazing) to a U-shaped end 82 of an arm 84 being itself secured to the third flange 8. The arm 84 also may provide an electrical connection between the emitter 81 and a hot cathode heater power supply 100 able to generate, e.g., a few watts for heating the electron emitter 81. Heater current 100 may be selected according to what is described in e.g., U.S. Pat. Nos. 3,756,682, 3,775,216 or 3,546,512.

The thermionic cathode 80 of the ion source may be of the "dispenser" or "volume" type. A dispenser cathode used in a hydrogen environment maximizes electron emissions per heater power unit compared to other thermionic type cathodes (such as $LaB_6$ or W), while operating at a moderate temperature. The emitter block 81 comprises a substrate made of porous tungsten, impregnated with a material susceptible to emit electrons, such as compounds made with combinations of e.g. barium oxide and strontium oxide. Each cathode has different susceptibility to their operating environment (gas pressure and gas species). Dispenser cathodes are known to be the most demanding in terms of the vacuum requirements and care that is needed to avoid contamination. Possible advantages of using a dispenser cathode as explained herein may include that the PNG may be operable as long as several hundred hours in a hydrogen gas environment of pressure on the order of several mTorr, providing an peak electron emission current of from 50 to 80 mA yet requiring only a few watts of heater power.

The cathode 80 may be provided with current from a the cathode heater power supply 100, which is distinct from an ion source voltage supply 102. Such implementation permits a better control of both the cathode heater power supply 100 and the ion source voltage supply 102. It should be clearly understood that using the foregoing dispenser type cathode is not a limitation on the scope of PNG tube structures that may be used. The gas reservoir 25 may be used equally with Penning-type (cold cathode) PNG tubes to provide an even lower power consumption neutron tube.

An extracting electrode 50 may be disposed at the end of the ion source 45 facing target 15, at the level of the junction between the tube 11 and the ring 12. The extracting electrode 50 may be supported in fixed relation to the ring 12 by a fifth flange 32. The extracting electrode 50 may include a massive annular body 46, e.g., made of nickel or an alloyed metal such as one sold under the trademark KOVAR, which is a registered trademark of CRS Holdings, Inc., 1105 North Market Street Suite 601 Wilmington Del. 19801. The annular body 46 may be in alignment with the longitudinal axis of the tube 11. A central aperture 47 in the body 46 diverges outwardly in a direction away from the ion source 45 to produce at the end of body 46 facing target electrode 15 a torus-shaped contour 51. The contour 51 reduces a tendency to voltage breakdown that is caused by high electrical field gradients.

Moreover, the extracting electrode 50 may provide one of the electrodes for an accelerating gap 72 that impels ionized deuterium and tritium particles from the ion source 45 toward a deuterium- and/or tritium-filled target 73. The target 73 comprises a thin film of titanium, scandium or other known hydride system deposited on the surface of the transverse side, facing ion source 45, of the target electrode 15.

The potential that accelerates the ions to the target 73 is established, to a large extent, between the extracting electrode 50 and a suppressor electrode 75 hereafter described. The suppressor electrode 75 may be a concave member that is oriented toward the target electrode 15 and has a centrally disposed aperture 78 which enables the accelerated ions to move from the gap 72 to the target 73. The aperture 78 is disposed between the target 73 and the extracting electrode 50. The suppressor electrode 75 is connected to a high voltage power supply 103 which may also be connected, through a resistor "R" to ground potential. In order to prevent electrons from being extracted from the target 73 upon ion bombardment (these extracted electrons being called "secondary electrons"), the suppressor electrode 75 is held at a negative voltage with respect to the voltage of the target electrode 15. The high voltage power supply may be regulated as explained with reference to FIG. 3.

The velocity of the ions leaving the ion source 45 is, on an average, relatively lower than ion velocity in a known Penning source. Consequently, the ions tend to generate a tail in the neutron pulse, at the moment the voltage pulse to the ion source 45 is turned off. The presence of an end tail is detrimental to the neutron pulse shape (i.e., numbers of neutrons generated with respect to time which is of importance. The example PNG structure remedies this situation by adding to the extracting electrode 50, a cut-off electrode 95, which may be in the form of a mesh screen 95 and which may be fixed, e.g., by welding, to the aperture 47 of the extracting electrode 50, facing the ion source 45. The mesh screen 95 (cut-off electrode) may be made of, for example, high transparency molybdenum. The cut-off electrode 95 has applied thereto voltage pulses synchronized with and complementary to the voltage pulses applied to the ion source anode 57. The pulses applied to the cut-off electrode 95 are positive and may be on the order of 100 to 300 volts. In an alternate example, the cut-off electrode 95, instead of having applied thereto voltage pulses, is maintained at a positive voltage, of e.g. a few volts. This low positive voltage prevents the slow ions produced at the end of the pulse in the ion source from leaving the ion source, and thus allows truncation of the terminal part of the ion beam, which in turn provides a sharp cut-off at the end of the neutron pulse (i.e. a short fall time). The cut-off electrode 95 may be made of a metallic grid in the form of a truncated sphere, and its concavity directed toward the target 73. Part of the cut-off electrode 95 might protrude inside the cylindrical hollow anode 57.

The foregoing example of a neutron generator tube is only meant to serve as one example of a use for a regulated high voltage power supply according to the present disclosure. Other uses may include, without limitation, x-ray generators and cathode ray tube (CRT) displays. As explained below with reference to FIGS. 4 and 5, a high voltage control system may be used in various types of well logging instruments.

Figure 4:
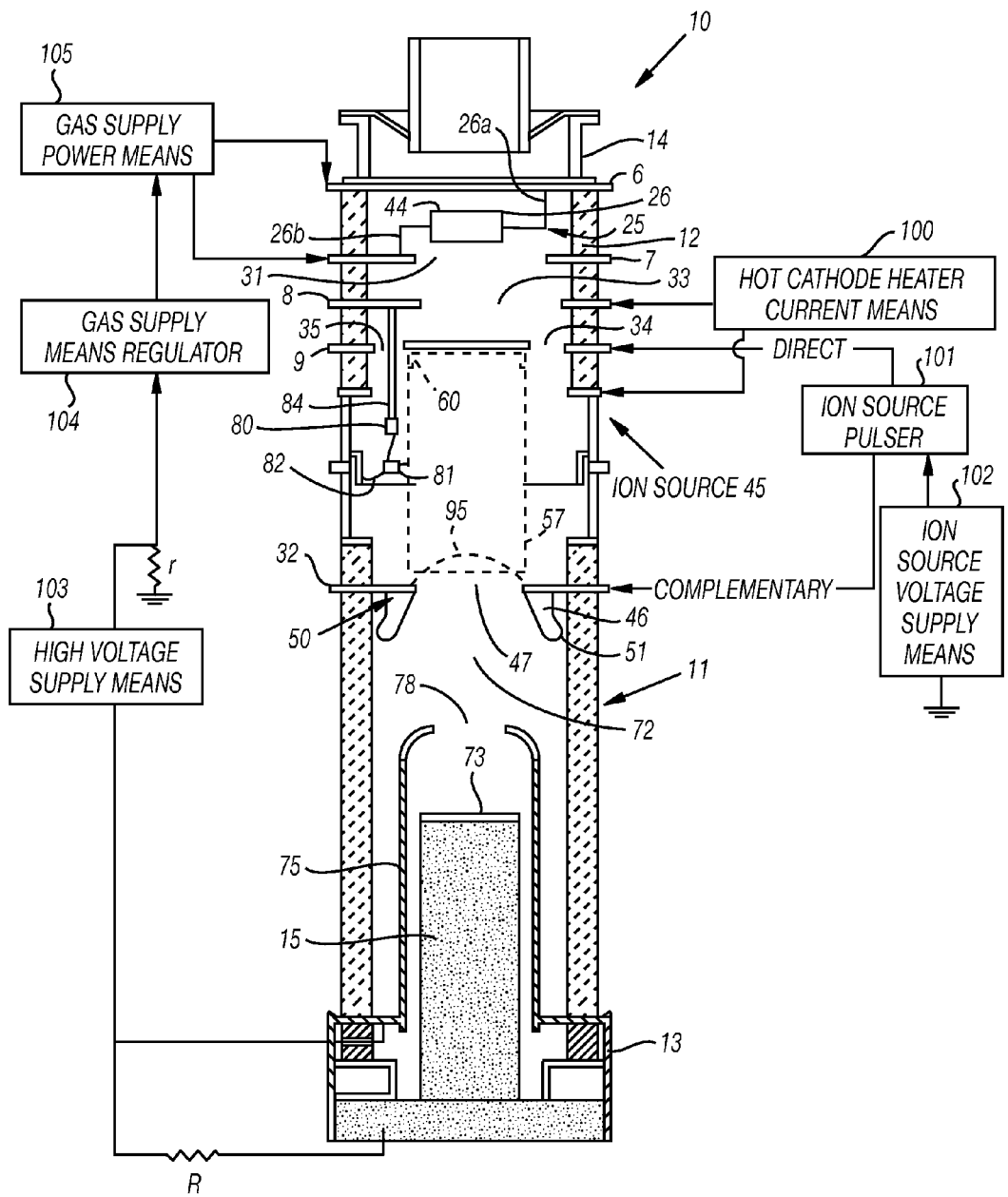
FIG. 4 shows an example pulsed neutron tube that may use a high voltage power supply control according to the present disclosure.
Figure 5:
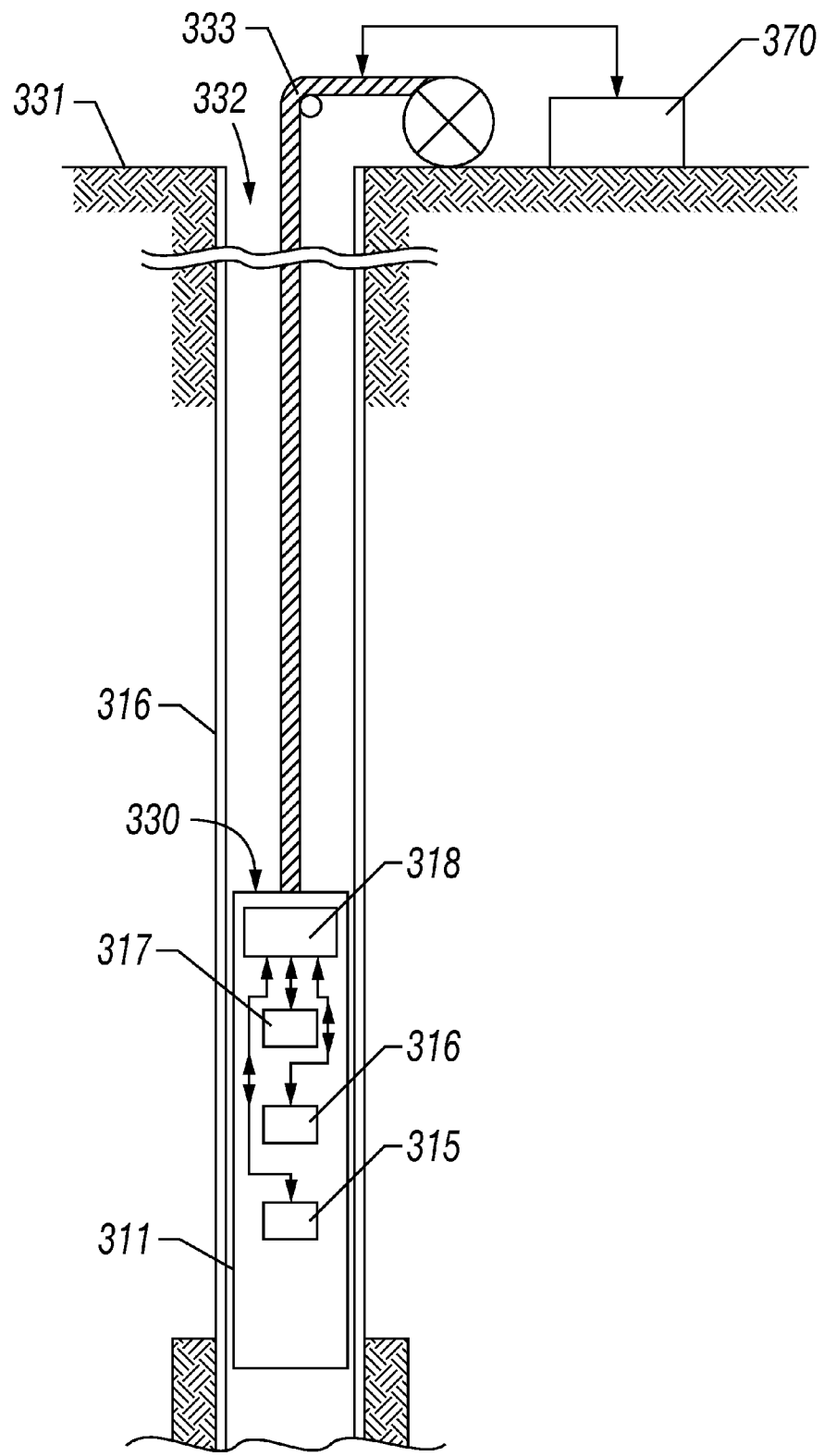
FIG. 5 shows an example wireline well logging instrument that may use a radiation generator operated by a high voltage power supply having a control system according to the present disclosure.

FIG. 4 shows an example well logging instrument 330. The measurement components of the instrument 330 may be disposed in a housing 311 shaped and sealed to be moved along the interior of a wellbore 332. The instrument housing 311 may contain at least one energy source 315, e.g., a neutron source such as electrically operated pulsed neutron source ("source"), or an x-ray generator and one or more detectors 316, 317 each disposed at different axial spacings from the source 315. The source 315 may be similar to the pulsed neutron source explained with reference to FIG. 4 and may emit neutron radiation, or may be, for example, an x-ray generator. Shielding (not shown) may be applied between the source 315 and the detectors 316, 317 to reduce direct transmission of neutrons from the source 315 to the detectors 316, 317. Thus, detected radiation may be characterized at each of a plurality of distances from the source 315, and thus have different lateral response (depth of investigation) into the formations surrounding the wellbore 332. In some examples, two or more different types of well logging instrument, each having a different type of source and different types of corresponding detectors may be included in the same instrument assembly of "tool string."

The instrument housing 311 maybe coupled to an armored electrical cable 33 that may be extended into and retracted from the wellbore 332. The wellbore 332 may or may not include metal pipe or casing 316 therein. The cable 333 conducts electrical power to operate the instrument 330 from a surface 331 deployed recording system 370, and signals from the detectors 316, 317 may be processed by suitable circuitry 318 for transmission along the cable 333 to the recording system 370. The recording system 370 may include a processor, computer or computer for analysis of the detected signals as well as devices for recording the signals communicated along the cable 333 from the instrument 330 with respect to depth and/or time.

The well logging tool described above can also be used, for example, in logging-while-drilling ("LWD") equipment. As shown, for example, in FIG. 6, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. In some configurations, he drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be used.

A bottom hole assembly ("BHA") 236 may be mounted within the drill string 214, and may be near the drill bit 216. The BHA 236 may include subassemblies for making measurements, processing and storing information and for communicating with the Earth's surface. Such measurements may correspond to those made using the instrument string explained above with reference to FIG. 5. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars may depend on drilling conditions as well as on the demands of the measurement.

Figure 6:
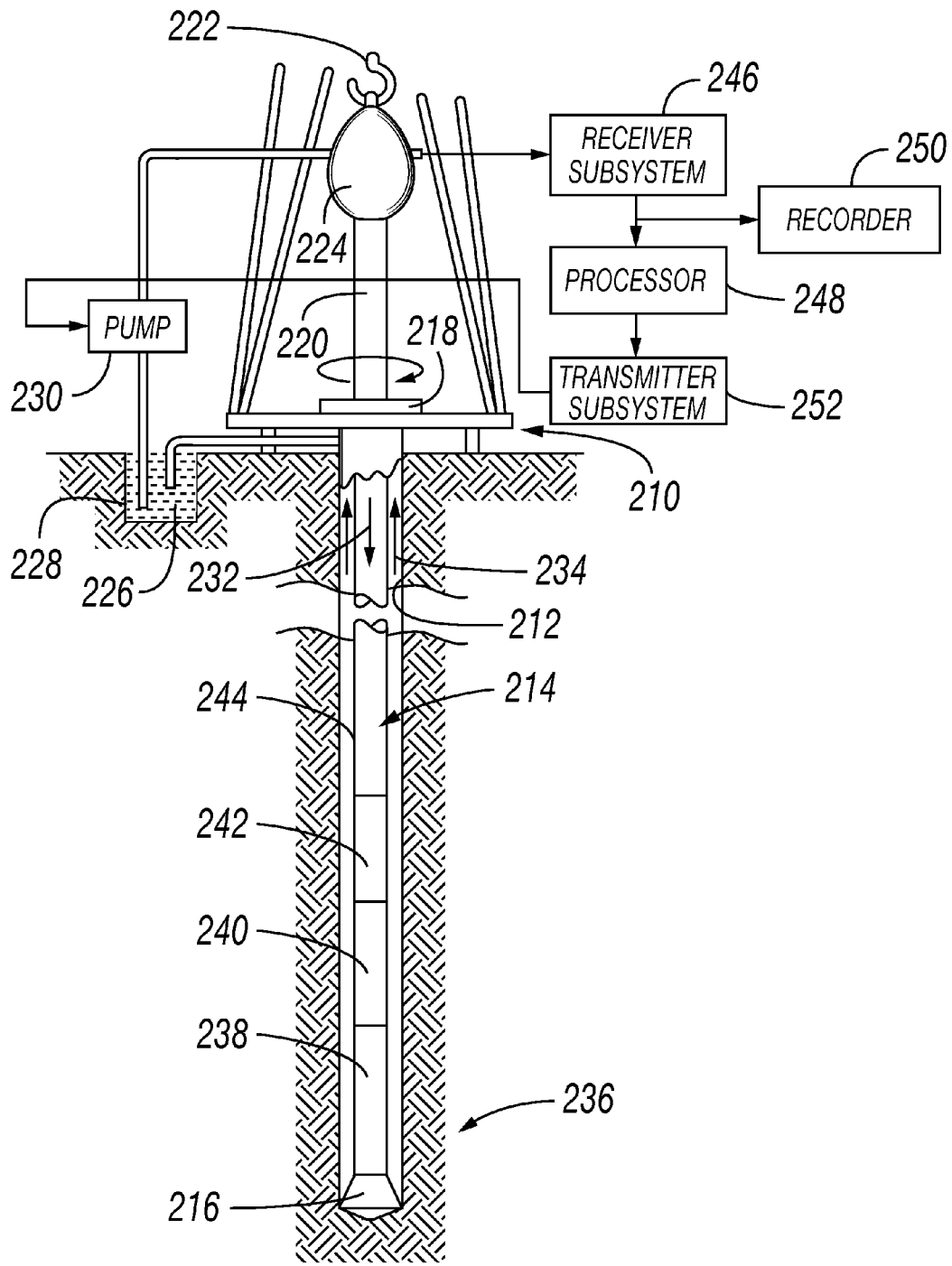
FIG. 6 shows a logging while drilling (LWD) logging instrument that may use a radiation generator and high voltage power supply/control system according to the present disclosure.

In the arrangement shown in FIG. 6, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing examples of logging instrument conveyance described above with reference to FIGS. 5 and 6 are not intended to limit the scope of the present disclosure. Any known well logging instrument conveyance, including without limitation slickline, coiled tubing, production tubing an casing may be used to equal effect.

While the above disclosure has been described with respect to a limited number of embodiments, those skilled in the art, having benefit of this disclosure, will appreciate that other embodiments can be devised which do not depart from the scope of what has disclosed herein. Accordingly, the scope of this disclosure should be not limited.

What is claimed is:

1. A method for regulating output of a high voltage power supply, comprising:
   monitoring a voltage output of a high voltage generator and comparing it to a voltage setpoint to generate an error signal;
   measuring a parameter corresponding to a load on the high voltage generator to generate a load signal;
   conducting the load signal to a feedforward signal generator, the feedforward signal generator producing a feedforward signal corresponding to the load and to at least one parameter related to load behavior of the high voltage generator; and
   conducting the error signal to a high voltage regulation loop, an output of the high voltage regulation loop and the feedforward signal coupled to a driver for the high voltage generator.

2. The method of claim 1 wherein the at least one parameter comprises at least one of output impedance of the high voltage generator, temperature, operating frequency of the high voltage generator, operating pulse duration of the high voltage generator, age of the high voltage generator, pulsing mode of the high voltage generator, load sensing network response and anticipated change in load on the high voltage generator.

3. The method of claim 2 wherein the anticipated change in load comprises a pending request for more or less radiation output of an electrically operated radiation generator operated by the high voltage generator.

4. The method of claim 2 wherein the electrically operated radiation generator operates a neutron generator.

5. The method of claim 4 wherein the neutron generator comprises part of a well logging instrument.

6. The method of claim 2 wherein electrically operated radiation generator comprises an x-ray generator.

7. The method of claim 6 wherein the x-ray generator comprises part of a well logging instrument.

8. The method of claim 1 wherein the method is performed on at least one of firmware executed in a microprocessor, a field programmable gate array, a complex programmable logic device and an application specific integrated circuit.

9. A high voltage power supply, comprising:
a high voltage generator having a voltage output controlled by a control signal voltage at an input thereof;
a voltage monitor in signal communication with an output of the high voltage generator and a voltage reference, an output of the voltage monitor comprising an error signal;
a load monitor in signal communication with the output of the high voltage generator, an output of the load monitor comprising a load signal;
a feedforward signal generator in signal communication with the output of the load monitor, the feedforward signal generator producing a feedforward signal corresponding to the load signal and to at least one parameter related to load behavior of the high voltage generator; and
a high voltage regulation loop, an output of the high voltage regulation loop and the feedforward signal coupled to a driver, the driver generating the control signal voltage.

10. The high voltage power supply of claim 9 wherein the voltage monitor, the load monitor, the feedforward signal generator and the high voltage regulation loop are implemented on at least one of a microprocessor, a field programmable gate array, a complex programmable logic device and an application specific integrated circuit.

11. The high voltage power supply of claim 9 wherein the at least one parameter comprises at least one of output impedance of the high voltage generator, temperature, operating frequency of the high voltage generator, operating pulse duration of the high voltage generator, age of the high voltage generator, pulsing mode of the high voltage generator, load sensing network response and anticipated change in load on the high voltage generator.

12. The high voltage power supply of claim 9 wherein a load thereon comprises at least one of an electrically operated neutron generator and an x-ray generator.

13. The high voltage power supply of claim 12 wherein the at least one of an electrically operated neutron generator and an x-ray generator comprise a part of a well logging instrument.

14. The high voltage power supply of claim 13 wherein the well logging instrument is conveyed through a wellbore on an electrical cable.

15. The high voltage power supply of claim 13 wherein the well logging instrument is conveyed through a wellbore on a drill string.

16. A method for well logging, comprising:
moving a well logging instrument along a wellbore traversing subsurface formations, the well logging instrument including an electrically operated radiation source and a high voltage power supply connected therefor, the well logging instrument including at least one radiation detector;
applying high voltage from the power supply to the radiation source;
detecting radiation at the at least one radiation detector; wherein
a voltage generated by the high voltage power supply is controlled by,
monitoring a voltage output of a high voltage generator and comparing it to a voltage setpoint to generate an error signal,
measuring a parameter corresponding to a load on the high voltage generator to generate a load signal,
conducting the load signal to a feedforward signal generator, the feedforward signal generator producing a feedforward signal corresponding to the load and to at least one parameter related to load behavior of the high voltage generator and
conducting the error signal to a high voltage regulation loop, an output of the high voltage regulation loop and the feedforward signal coupled to a driver for the high voltage generator.

17. The method of claim 16 wherein the well logging instrument is moved along the wellbore on an electrical cable.

18. The method of claim 16 wherein the well logging instrument is moved along the wellbore by a drill string.

19. The method of claim 16 wherein the radiation source comprises a neutron generator.

20. The method of claim 16 wherein the radiation source comprises an x-ray generator.

21. The method of claim 16 wherein the at least one parameter comprises at least one of output impedance of the high voltage generator, temperature, operating frequency of the high voltage generator, operating pulse duration of the high voltage generator, age of the high voltage generator, pulsing mode of the high voltage generator, load sensing network response and anticipated change in load on the high voltage generator.

* * * * *